United States Patent
Brandel et al.

[15] 3,705,511
[45] Dec. 12, 1972

[54] LOW PENETRATION BALL FORMING PROCESS

[72] Inventors: Wynand W. Brandel, Nashville; Lawrence S. Klass, Donelson, both of Tenn.

[73] Assignee: Avco Corporation, Nashville, Tenn.

[22] Filed: Oct. 17, 1969

[21] Appl. No.: 867,132

[52] U.S. Cl. .................................................. 72/53
[51] Int. Cl. ............................................... B21j 5/00
[58] Field of Search ...... 72/53, 40, 425; 51/319, 320, 51/9

[56] References Cited

UNITED STATES PATENTS

| | | | |
|---|---|---|---|
| 937,180 | 10/1909 | Ridd | 72/53 |
| 2,701,408 | 2/1955 | Borger | 72/53 |
| 2,881,506 | 4/1959 | Fuchs | 72/53 |
| 3,098,324 | 7/1963 | Straub | 51/320 |

Primary Examiner—Charles W. Lanham
Assistant Examiner—Gene P. Crosby
Attorney—Charles M. Hogan and Irwin P. Garfinkle

[57] ABSTRACT

A controlled metal deformation process for shaping, forming or contouring metal sheet, plate, and wrought shapes such as extrusions comprising flowing a quantity of metal balls (generally greater in size and mass by several orders of magnitude than standard shot consisting of an aggregate of sizes used in conventional shot peening processes) over the surface to be deformed. The novel process includes impacting the surfaces with metal balls at relatively low velocities, such as by using the force of gravity and resulting in low penetration of ball into metal surface, while the part being formed is in a prestressed condition and moving through the metal ball delivery stream.

3 Claims, 1 Drawing Figure

PATENTED DEC 12 1972
3,705,511
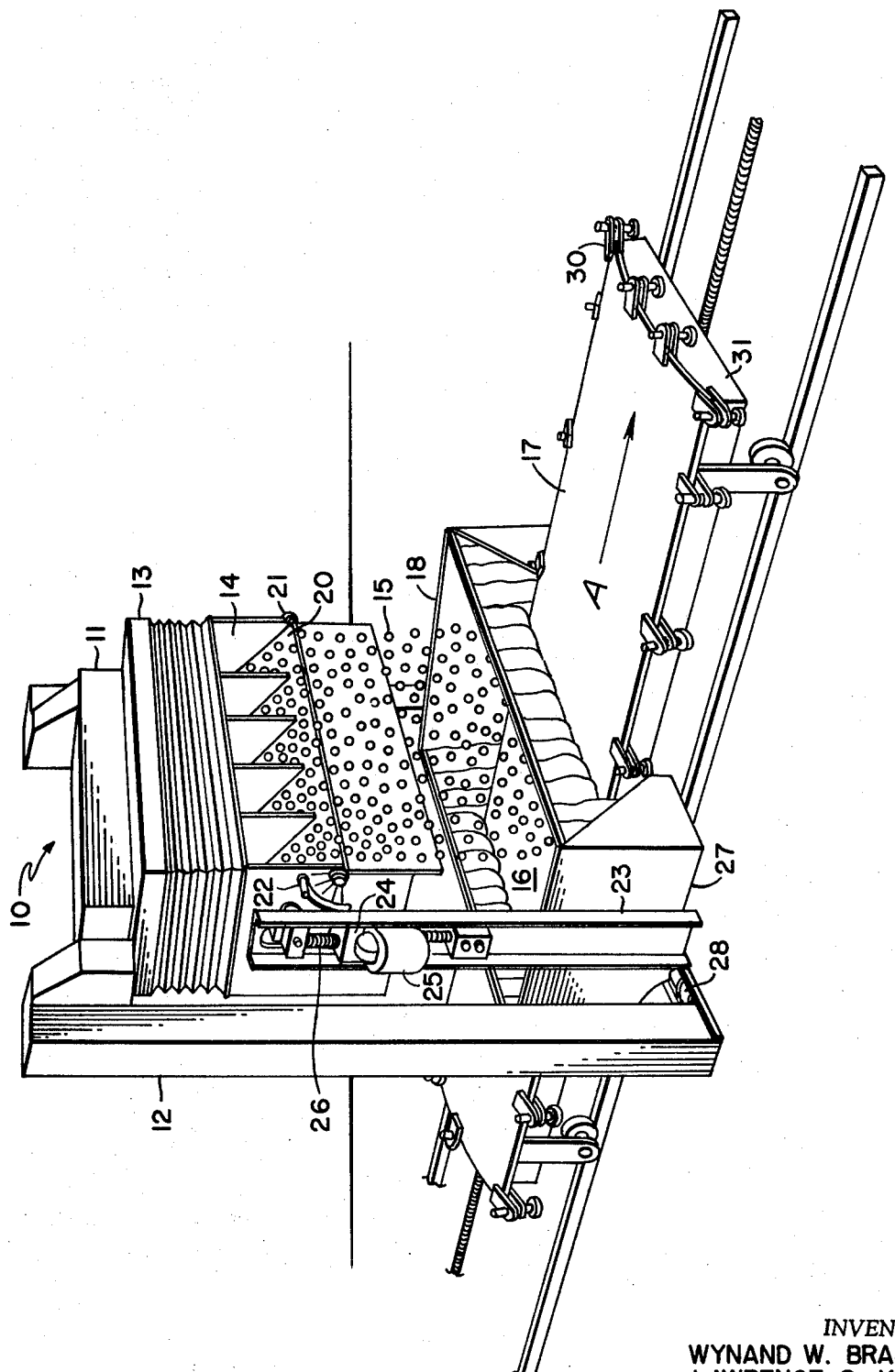
INVENTORS.
WYNAND W. BRANDEL
LAWRENCE S. KLASS
BY
Charles M. Hogan
Irwin P. Garfinkle
ATTORNEYS.

LOW PENETRATION BALL FORMING PROCESS

BACKGROUND

The design of aircraft of increasingly high performance and physical size has created a need for new methods of producing shapes in high strength, heat treated aluminum alloys. Conventional methods utilizing presses, dies, stretch forming equipment, and similar mechanical forming methods have severe limitations with respect to part size, varying section thicknesses, cutouts, and temperature effects on mechanical properties of structural materials. An example of an aircraft part requiring forming, but for which conventional methods are inadequate is a wing skin component.

The use of shot peening in the aircraft industry to date, relative to structural members, has been in general limited to imparting stress corrosion resistance to select parts or areas of parts, enhancement of fatigue properties, and mild contouring or configuration correction. Principally, these operations have been performed using an industry standard SAE type of shot consisting of an aggregate of varying shot particle sizes, the largest size classification of which contains a majority size of 0.132 inch in diameter. In addition to using these aggregates, large balls (¼ inch diameter hardened steel) have sometimes been used for creating an abrupt change in spanwise contour of certain wing skins by propelling forming balls with high air pressure in a very confined band. Somewhat smaller (0.174 inch diameter) forged steel balls have been used to impart mild chordwise contour to certain large wing skin components.

Conventional shot peening methods, although capable of producing approximate contours in heat treated 7075 aluminum alloy plate, do not provide sufficiently smooth aerodynamic surfaces for the contours required. In addition to this limitation, conventional shot peen forming often results in an inferior surface condition, i.e., small metal folds as potential stress risers in the metal surface not characteristic of a surface subjected to ball forming according to the present invention.

THE INVENTION

Low penetration ball forming according to the invention is a controlled metal deformation process for shaping, forming, or contouring metal by the impact of balls at low velocity on a metal surface. The low velocity, in contrast with the high velocity used in conventional shot peening processes, may be provided by the force of gravity or by other means. For example, ball velocities of 15 feet per second and less have been used to contour 0.4 inch thick 7075-T7651 aluminum alloy plate, contrasting with S660 shot in conventional shot peening equipment of the order of 100 feet per second. Gravity as a motivating force to provide ball velocity, may be utilized by the rolling of balls on an inclined plane or by free fall of balls, or by combinations thereof. The impact force of a ball in a metal surface produces a compression layer of metal immediately adjacent to the indentation and at the same time creates radial movement (expansion) of a superficial layer of surface metal which results in a contour.

The ball, as used in forming, must be of substantial size, greater by several orders of magnitude than the largest size of steel shot listed in the standard size specifications of SAE J444, for example, ¼ inch diameter or greater. Large balls as small as ⅛ inch diameter could be used in mild forming operations such as the mold contouring of a thin sheet, especially if fine surface finishes are required. The ball must be of higher hardness than the material being formed, and may be, but is not limited to, hardened steel or case hardened steel.

A unique feature of the low penetration ball forming process of the invention is the ability to contour metal and obtain superior surface finishes. Surface finish is of utmost importance when the formed surface is an aerodynamic surface of modern high-speed aircraft. Superior surface finishes are thus obtained in forming metal to a given contour using much larger steel balls than obtained using a standard type of steel shot consisting of an aggregate of relatively small sizes. The superior surface finish, characteristic of the process of the invention is explained by noting that the larger mass of a ball requires less impact force and the ball indentations are larger and shallower than the indentation pattern of an aggregate of small sized particles. The net result is a smoother surface (as determined with a profilometer) to produce a given contour.

A special feature of the invention is that contouring can be accomplished with relatively little forming force. In fact, gravity alone is sufficient force when acting on balls in free fall to produce some contours. These contours can be increased by impacting the part when the metal surface is in a state of tension, i.e., prestressed, as by establishing a convexity in the workpiece by mechanical means. Thus, the use of conventional shot peening equipment that mechanically or pneumatically provides the propelling velocity to shot particles is not required. In fact, such equipment would be entirely unsuitable when fine surface finishes are required, since the forming energies are too great.

The invention is applicable to shaping any metal that exhibits elastic properties under load. Magnesium, aluminum and various types of steels are examples of metals that can be shaped by the impact of balls on the metal surface. With appropriate application, the process may be applied to metal sheet, plate and structural shapes. It is, however, particularly suited to contouring of thick sections of relatively malleable metals, contouring of parts requiring relatively fine surface finishes, contouring of metal clad with a softer layer of metal than the substrate, and producing severe contours.

An example of the equipment with which the process of the invention may be carried out is illustrated in the accompanying perspective drawing. In the drawing a cabinet 10 is erected on a suitable framework carrying a ball separator 11 to which balls are fed from a ball elevator 12 and from which balls drop into a feed hopper 13. From hopper 13 single or multiple ball delivery chutes 14 permit the balls to drop or flow as at 15 in a region 16 on the upper surface of the workpiece 17. This region is preferably surrounded by heavy rubber curtains 18.

Chutes 14 are desirable formed on a plate 20 rotatable on an axis 21 in order to permit adjustment of the chute angle by adjusting mechanism 22. A channel 23 is provided to support a slide 24, actuated by a motor 25 to turn a screw 26, which moves the slide vertically, thus serving as a chute height adjustment. A hopper 27 collects energy-spent balls and guides them to the infeed end 28 of elevator 12.

Except for the ball delivery chutes and the provision for their adjustment (incline-wise and height-wise), the above described equipment is more or less conventional and need not be further described.

The workpiece 17 is moved linearly in the direction of arrow A by a conventional roller and track arrangement as illustrated.

Prestressing may be accomplished by hold-down clamps 30 forcing the sheet 17 to the contour of forms 31, the amount of bend and consequent stress being preestablished along with the other parameters including the weight of the balls, rate of ball flow, height of drop, angle of release chute and rate of linear progress of the workpiece.

We have found that good results have been obtained in contouring heat treated 7075 aluminum alloy plate of ½ inch thickness utilizing ¼ inch diameter steel balls dropped in an approximate line from a distance of 3 ½ feet. The desired contour was obtained by controlling the ball indentation coverage on the workpiece regulated by the rate of ball delivery and linear movement of the workpiece. The low impact velocity thus obtained by the standard Almen intensity test was less than normally acceptable when using an Almen A test strip. In other words, when forming metal sheet or plate of a given thickness to a given contour, the intensity of ball forming as measured by a standard Almen test strip is substantially less than when using conventional shot, even though approximately the same degree of forming was performed on the workpiece.

From the foregoing it will be noted that ball forming according to the present invention may be performed on the workpiece in the free state or in a prestressed condition. The free state, or unrestrained condition, is to be used for thin gauge sheet material, or very mild contours in heavier gauge material. Regardless of the material thickness, superior surface finishes will be obtained by prestressing of the workpiece.

It should also be noted that either the part can be moved through the ball stream, or the ball stream can be moved over the part. The movement of the part or the ball stream is not limited to one single direction. Horizontal movement, for example, can be either forward or backward.

In comparison with metal contouring accomplished by conventional shot peening with standard types of shot consisting of a size aggregate, the invention offers the following advantages:

1. Less forming equipment is required to deliver the balls to the work.
2. Finer surface finishes are obtainable for producing a given contour in a given thickness of metal.
3. Heavier thicknesses of material can be formed.
4. Clad metals are more readily formed without deep penetration of the forming particles into the protective cladding.
5. Fewer particles supplying the forming energy are required to produce a given contour, thereby making for greater control of the forming process. (Controlled metal deformation.)
6. The forming particles (balls) do not deteriorate or disintegrate with use since particle velocity is very low.
7. The low penetration ball forming process, utilizing relatively low impact velocities and large impact areas per particle (ball), is superior to conventional shot peening for correcting distorted and deformed shapes, i.e., less propensity to damage configuration and surface finish in the correction process.
8. Forming of metal can be accomplished without deleterious surface effects such as folds and microfissures which can be potential stress risers to failure propagation.
9. The relatively low ball velocities result in negligible equipment and tooling wear as opposed to the severe abrading action of conventional shot peening.
10. Inexpensive masking materials for selective particle impingement can be utilized with long life because of the low ball velocities.
11. The safety hazard is minimized because of relatively low ball velocities utilized.
12. The health hazard is minimized because of the negligible generation and emittance of fine metal dust.

Having thus described our invention, we claim:

1. A controlled metal deformation process for shaping, forming or contouring metal parts such as metal sheet, plate and shapes comprising allowing metal balls to freely fall be gravity upon a selected area of the surface of said metal parts while relatively moving said metal parts linearly across the region of impact, said balls being composed of metal of greater hardness than the metal to be formed, and being of uniform size within a range of sizes several orders of magnitude greater than shot sizes listed in the standard size specification of SAE J444, and simultaneously maintaining the surface of said parts under tension by establishing a convex curvature thereof at the region of impact.

2. The process as defined in claim 1 wherein said balls are at least one-eighth inch in diameter.

3. A controlled metal deformation process for shaping, forming or contouring metal parts such as metal sheet, plate and shapes comprising dropping metal balls and permitting said balls to freely fall by gravity upon a selected area of the surface of said metal parts while relatively moving said metal parts across the region of impact, said balls being composed of metal of greater hardness than the metal to be formed, and being of uniform size, and simultaneously maintaining the surface of said parts under tension by establishing a convex curvature thereof at the region of impact.

* * * * *